United States Patent [19]

Phillips, Jr.

[11] 4,221,576
[45] Sep. 9, 1980

[54] AUTOMATIC AIR FILTER CHANGER

[75] Inventor: Robert E. Phillips, Jr., Baton Rouge, La.

[73] Assignee: James M. Perrier, Sr., New Orleans, La. ; a part interest

[21] Appl. No.: 5,031

[22] Filed: Jan. 19, 1979

[51] Int. Cl.² .............................................. B01D 46/18
[52] U.S. Cl. ..................................................... 55/352
[58] Field of Search ................ 55/290, 352, 353, 354, 55/213, 274; 210/400, 401

[56] References Cited

U.S. PATENT DOCUMENTS

| | | | |
|---|---|---|---|
| 2,192,224 | 3/1940 | Forsberg | 55/274 |
| 3,102,014 | 8/1963 | Ailkenhead | 55/352 |
| 3,552,098 | 1/1971 | Cochran | 55/351 |
| 4,040,040 | 8/1977 | Mayer | 55/274 |

*Primary Examiner*—Bernard Nozick
*Attorney, Agent, or Firm*—Clarence A. O'Brien; Harvey B. Jacobson

[57] ABSTRACT

The changer includes a filter supporting frame attached to a supply spool containing fresh filter material and a take-up spool for storing the clogged filter material. The frame is substantially rectangular in shape and has attached thereto a sensor switch which is disposed medially of the frame and the filter material disposed thereacross. The switch is actuated when the filter material becomes clogged to a point where deflection of the material in response to circulating air flow occurs. The switch actuates a drive motor attached to the take-up spool causing the take-up spool to wind the clogged material thereon thereby replacing it with clean filter material from the supply spool. The filter material itself contains transverse enlarged linear elements which are longitudinally spaced along the filter material at intervals equivalent to the width of the frame. The enlarged areas actuate a switch which causes cessation of the motor drive, thereby insuring accurate placement of the fresh filter material.

10 Claims, 5 Drawing Figures

AUTOMATIC AIR FILTER CHANGER

BACKGROUND OF THE INVENTION

1. Field of the Invention

This invention relates to systems for replacing clogged filter elements with fresh filter elements in forced air systems and the like.

2. Description of the Prior Art

It is common knowledge that the efficiency, and thereby the cost of operation, of forced air heating and cooling systems is greatly dependent upon the condition of the filters used in those systems for maintaining clean air. Often manual replacement of the filters is relied upon to insure their cleanliness. Therefore, a need has developed for an inexpensive, effective mechanism which may replace clogged filter elements with fresh filter elements without the need of manual intervention.

U.S. Pat. No. 2,848,064, issued Aug. 19, 1958, to Gregory et al, shows an automatic filter changing device wherein the rate of air flow through a filter is measured by a pressure switch and upon the rate of flow decreasing below a predetermined minimum, the motor is started to advance a roll of filter material to the next clean position. The advance of the material is measured by a cam which contacts and rolls with the advancing filter material for stopping the motor after a predetermined linear measurement has been attained. U.S. Pat. No. 3,552,098, issued Jan. 5, 1971, to Cochran, shows an air filter control arrangement wherein a differential pressure sensor senses the difference in pressure on opposite sides of a filter medium and causes a predetermined length of filter medium to be fed out from a supply roll upon the increase of the sensed difference in pressure reaching a predetermined level. The Cochran control includes a wheel which rides against the filter medium for measuring the length of medium removed from the supply roll.

SUMMARY OF THE INVENTION

An object of the present invention is to provide an automatic air filter changer which will constantly monitor the condition of a filter in a forced air system and provide a signal when the filter has become too clogged to allow for efficient operation of the forced air system.

A further object of the present invention is to provide an automatic filter changer in accordance with the above object which will exchange the clogged filter for a fresh filter element when necessary, thus maintaining clean filter material in the forced air system over an extended period of time without the need for manual intervention.

A still further object of the present invention is to provide an automatic air filter changer which is inexpensive to manufacture and operate and yet is efficient and effective in use.

In accordance with the above objects of the invention, the automatic air filter changer is provided with a pair of spools with one of the spools being motor driven and the other of the spools containing a supply of fresh filter material. The spools are mounted on a frame and the filter material is threaded from the supply spool over a pair of rollers onto the take-up spool. A switch is mounted to the rear of this filter material with the distance between the switch and filter material being adjustable. The switch is responsive to movement of the filter material caused by accumulated dust, dirt, and the like, resisting the passage of air through the filter. The switch actuation causes the motor driven take-up spool to commence operation whereupon the clogged material is wound upon a take-up spool and fresh filter material is fed out from the supply spool. The filter material itself has spaced longitudinally therealong a plurality of transverse lumps. The spacing between these lumps is equivalent to the amount of filter material necessary to replace the clogged filter element. These lumps sequentially actuate a second switch which causes cessation of operation of the take-up spool. In this manner after the take-up spool operation is started by the clogged filter, the next sequential lump will cause the filter material to stop advancing when a fresh filter is in proper registry with the frame.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
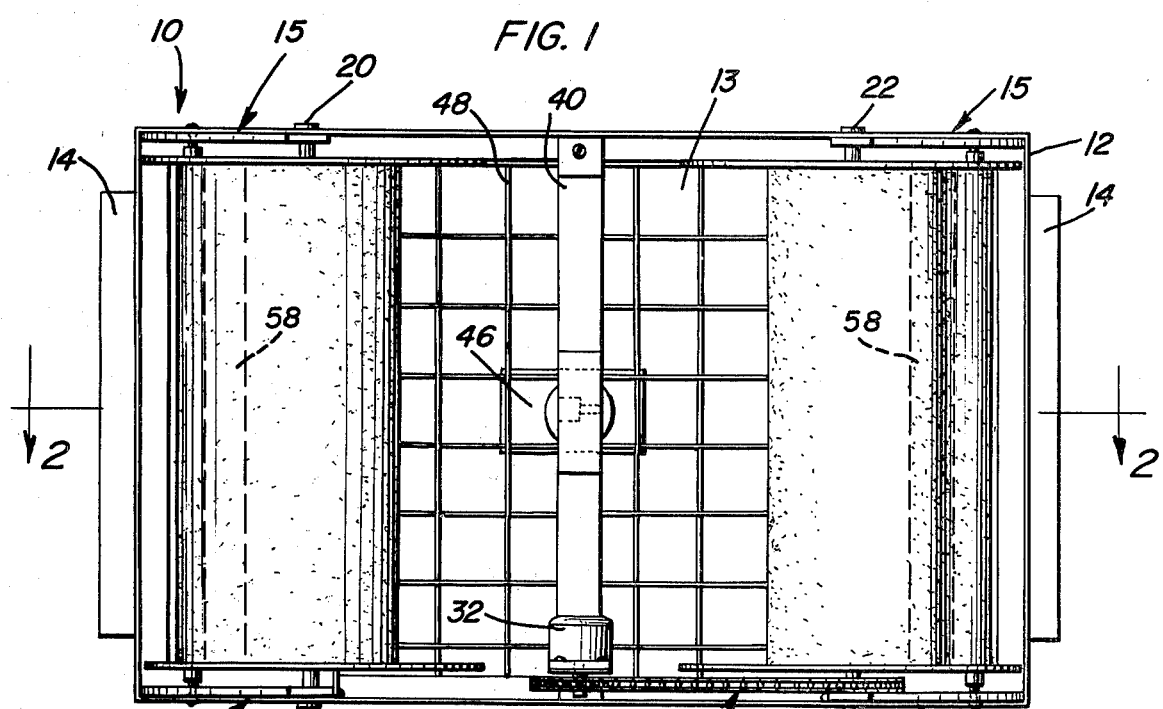
FIG. 1 is a bottom view of the automatic filter changer of the present invention.

Now with reference to the drawings, the automatic filter changer generally referred to by the numeral 10 will be set forth in detail. As can be seen, especially with reference to FIGS. 1 through 3, the automatic filter changer includes a generally rectangular frame 12 which has an open center across which the filter element 13 is disposed. Frame 12 includes a pair of mounting flanges 14 which extend laterally therefrom for mounting the frame and associated components of the automatic filter changer across the path of moving air in a forced air circulation system. For instance, the frame may be mounted across the air return duct of such a system.

Extending downwardly from the frame 12 are the four spool support structures 15, each of which comprises a vertical member 16 and an angled member 18. A pair of support structures 15 are used to mount each of axles 20 and 22. Axle 20 rotatably supports supply spool 24 on which the fresh filter material is stored. Axle 22 rotatably supports spool 26 upon which the clogged filter material is accumulated. The filter material itself extends from spool 24 over support bars 28 and 30 and onto spool 26. It should be evident that upon rotation of spool 26 fresh filter material will be unwound from spool 24 and will then move across the opening in frame 12 from support bar 28 to support bar 30 and then onto spool 26.

In order to accomplish rotation of spool 26, an electric motor 32 is provided. Motor 32 is mounted upon motor support bar 34 which itself extends between two of the vertical supports 16. Motor 32 drives spool 26 in a forward direction through chain and sprocket drive 36 which includes a sprocket attached to each of motor 32 and spool 26.

The mechanism for starting operation of motor 32 includes switch 38 which is mounted upon switch support member 40. The switch 38 is mounted below filter material 13 and includes actuation lever 42 which is depressed by extension 44 of switch plate 46. Switch plate 46 may be mounted upon wire mesh 48 which extends across the opening in the frame for supporting the filter material. When the device is placed in a downward air flow and the filter material becomes sufficiently clogged to resist the flow of air therethrough, the filter material 13 deflects downwardly along with the wire mesh 48 and thus brings extension 44 into contact with the switch lever 42 to cause actuation of motor 32 thereby rolling the clogged filter material onto spool 26 as described hereinabove.

Figure 3:
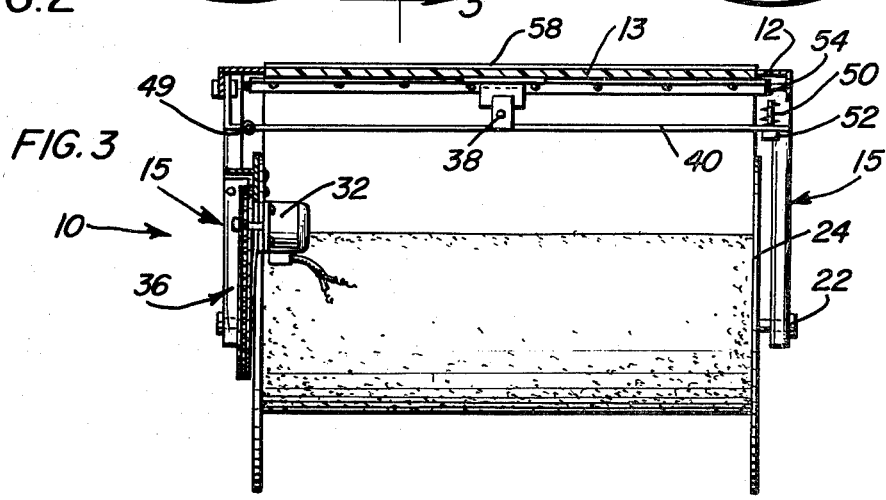
FIG. 3 is an elevational view taken substantially along a plane passing through section line 3—3 of FIG. 2 and shows the adjustment mechanism for the start switch of the automatic filter changer.

In order to control the degree of allowable clogging of filter 13 before actuation of motor 32, the distance between the switch 38 and switch plate 46 is made adjustable as seen in FIG. 3. This adjustability feature is provided by making one end of switch support member 40 pivot at 49 while the free end of the support member is biased away from the frame 12 by spring 50 with such spring bias being limited by bolt 52 which passes through the switch support member and frame 12 and is connected to nut 54. In this manner, the position of swtich 38, and thus the amount of deflection of filter material 13 allowed before actuation of motor 32 can be controlled by turning bolt 52 which adjusts the position of switch 38 relative to the filter material and switch plate 46.

Stop switch 55 is mounted along one edge of frame 12 in a position in the lateral middle of the filter material 13. Switch 55 has an actuation lever 56 which rests against the filter material 13 and is actuated by lateral bulges 58 in the filter material. The bulges 58 extend all the way across the filter material and are longitudinally spaced therealong at intervals approximately equivalent to the size of the opening in filter frame 12. Therefore, it can easily be seen that with motor 32 started by switch 38, upon an entire new segment of filter material 13 covering the opening of frame 12, the motor 32 will be stopped by the actuation of switch 55 by the next sequential bulge 58.

Figure 5:
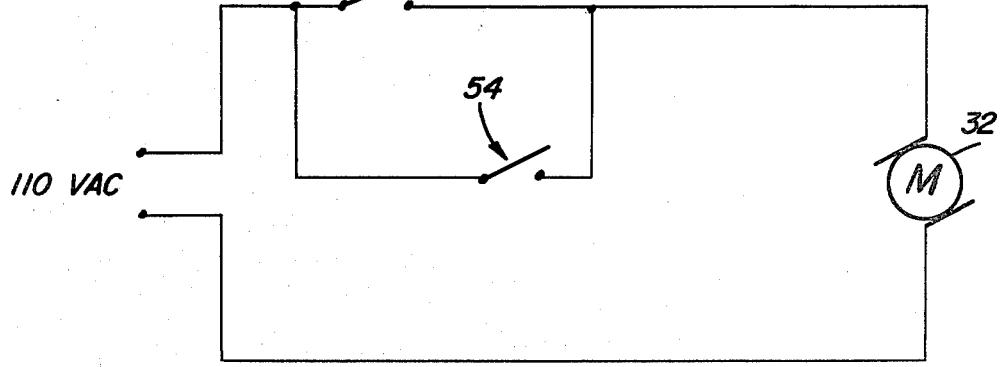
FIG. 5 is a schematic diagram of a circuit which may be used with the automatic filter changer.

In regard to this control mechanism, FIG. 5 shows a schematic wiring diagram which may be used to effect the connection of motor 32 to the 110 volt AC source. From an inspection of FIG. 5, it is clear that switches 38 and 55 are wired in parallel to each other and in series with motor 32. In this manner, with switch 38 in its normally open position and switch 54 being held open by one of the bulges 58, no current is provided to motor 32. Switch 38 is closed upon movement of filter 13 due to the increased air resistance thereof. Once bulge 58 has moved pass switch 54, switch 54 will be maintained in the closed position thus insuring a supply of current to motor 32 until the next sequential bulge effects an opening of switch 54 causing the motor 32 to be deenergized.

Figure 2:
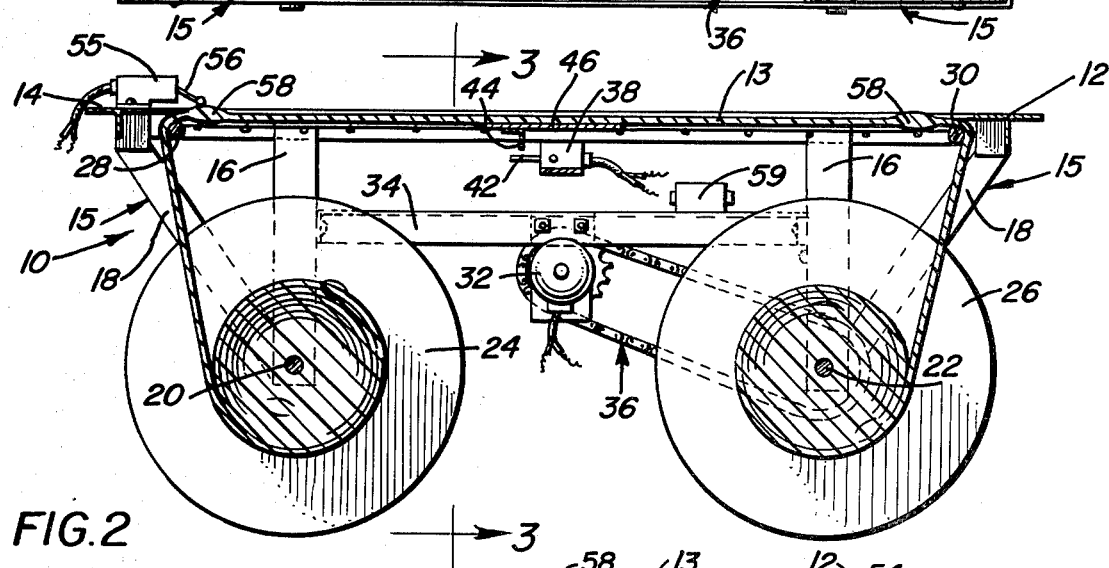
FIG. 2 is an elevational view taken substantially along a plane passing through section line 2—2 of FIG. 1 and showing the switch controls and motorized mechanism of the automatic filter changer.

Also, it will be understood that appropriate connectors, such as junction box 59 shown in FIG. 2, may be mounted on the mechanism in order to provide for proper connection of the circuit elements.

Figure 4:
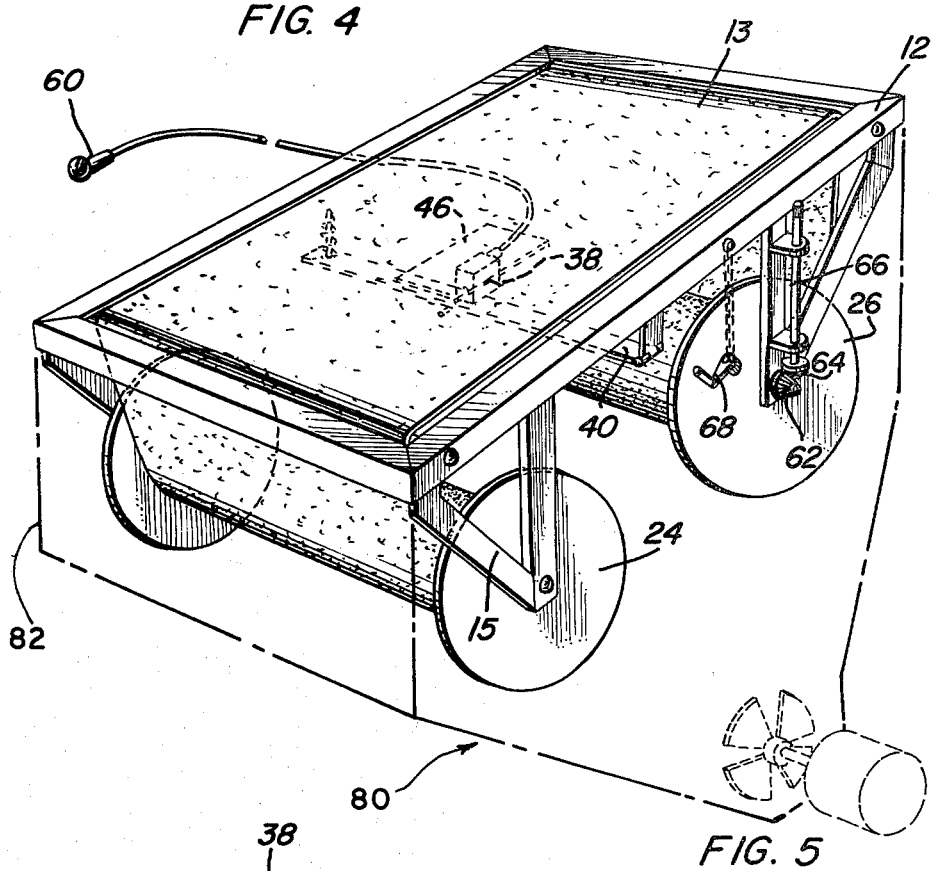
FIG. 4 is a perspective view of a manual embodiment of a filter changer wherein a warning light warns of the clogged filter condition.

Now with reference to FIG. 4, a manually actuated embodiment of the filter changer mechanism will be described in detail. In FIG. 4 all corresponding elements are labeled with corresponding reference numerals to those of the previously described embodiment. The manually operated version of the present invention includes all of the same elements as the automatic embodiment, including a supply spool 24 which supplies fresh filter material 13 to the opening in frame 12. The clogged filter material is then wound onto take-up spool 26. Furthermore, switch 38 is mounted upon adjustable switch support member 40 as described hereinabove and is actuated by switch plate 46. However, instead of effecting operation of an electric motor, switch 38 supplies current to warning light 60 which should be mounted in a clearly visible location in order to give adequate warning of the existence of a clogged filter. Rotation of spool 26 for replacing the clogged filter material with fresh filter material is produced through bevelled gears 62 and 64 which are rotated by shaft 66 and handle 68 which may be mounted upon the free end of that shaft. Of course, any other suitable manual actuation mechanism may be employed, as desired. Spool 26 should be rotated until it is evident that fresh filter material has replaced the clogged filter material presently held within frame 12. Such an indication may be made through visual observation of the filter. As with the automatic filter changer 10, the manual version is to be used in a forced air circulation system shown schematically at 80. The device may be disposed across the return air duct shown schematically at 82.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for replacing clogged filter material with fresh filter material comprising: a frame having a substantially planar open center area; a first spool rotatably attached to said frame and having an axis parallel to the plane of said open center; a second spool rotatably attached to said frame and having an axis parallel to the plane of said open center; a length of substantially planar filter material having a portion thereof wound about said first spool, said filter material extending from said first spool across said open center and having a second portion thereof wound about said second spool; forced air circulation means for causing a flow of air through said filter material in said open center; clogged filter sensing means disposed adjacent said filter material in said open center for sensing an increased deflection of said filter material in response to clogging of said filter material; power means for rotating said second spool in response to said clogged filter sensing means; and filter replacement measuring means at least partially affixed to said filter material for stopping rotation of said second spool when said open center of said frame is filled with fresh filter material.

2. The apparatus of claim 1 wherein said clogged filter sensing means is disposed medially of said open center and on the opposite side of said filter material in said open center from the direction of air circulation from said forced air circulation means.

3. The apparatus of claim 2 and further including mounting means for adjustably mounting said clogged filter sensing means for enabling an adjustment of the distance between said clogged filter sensing means and said filter material in said open center.

4. The apparatus of claim 1 wherein said filter replacement measuring means includes said filter material having spaced areas of increased cross section; and means for sensing said spaced areas of the increased cross section.

5. The apparatus of claim 4 wherein said means for sensing said areas of increased cross section includes a normally closed switch, said switch being rendered open upon contact with one of said areas of increased cross section.

6. The apparatus of claim 5 wherein said clogged filter sensing means includes a normally open switch which is rendered closed upon deflection of said clogged filter, said normally open switch being in electrical parallel circuit with said normally closed switch; and further wherein said power means includes an electric motor drivingly connected to said second spool, said electric motor being in series electrical circuit with said parallel combination of said normally open and normally closed switches and further in series with the source of electrical supply, said normally open and normally closed switches comprising the sole control components for the electric motor.

7. A filter changing apparatus for facilitating the replacement of clogged filter material in a forced air circulation system with fresh filter material comprising a frame means for holding filter material in an air flow stream in said forced air circulation system; a length of substantially planar filter material; a light metal mesh disposed in said frame in supporting relation to the filter material; a switch means disposed medially of said frame for actuation upon the clogging of said filter material causing a greater deflection of said filter material in response to said air flow; supply means for supplying said filter material to said frame; take-up means for removing clogged filter material from said frame; and power means for removing said filter material from said supply means for replacing the filter material in said frame and simultaneously removing the filter material from said frame and storing it on the take-up means.

8. The apparatus of claim 7 wherein said switch means is mounted medially of a mounting member having one end pivotally connected to said frame and the opposite end connected to said frame through an adjustment means for controlling the distance from said member to said frame.

9. The apparatus of claim 8 wherein said switch means is electrically connected to a circuit including a warning light for giving an indication of the clogged condition of said filter material.

10. The apparatus of claim 8 wherein said switch is connected to an electric circuit including an electric motor for causing a powered exchange of fresh filter material for clogged filter material.

* * * * *